United States Patent Office 3,379,759
Patented Apr. 23, 1968

3,379,759
SULFIDE-CHLORAMINE REACTION AND
PROCESS FOR MAKING SAME
Joseph A. Cogliano, Baltimore, and George L. Braude,
Linthicum, Md., assignors to W. R. Grace & Co., New
York, N.Y., a corporation of Connecticut
No Drawing. Continuation-in-part of application Ser. No.
562,116, July 1, 1966, which is a continuation-in-part
of application Ser. No. 306,683, Sept. 5, 1963. This application Feb. 1, 1967, Ser. No. 613,132
11 Claims. (Cl. 260—551)

ABSTRACT OF THE DISCLOSURE

A series of sulfur and nitrogen containing compounds prepared by reacting chloramine and an organic sulfide. The reaction is $R_2S + 2NH_2Cl \rightarrow R_2SN_2H_2 + 2HCl$, wherein R can be the same or different alkyl groups containing 1 to 36 carbon atoms, aryl groups, and substituted allyl and aryl groups, useful, inter alia, as insecticides and fungicides.

---

This application is a continuation-in-part of our earlier filed application S.N. 562,116, filed July 1, 1966, now abandoned; which is a continuation-in-part of our earlier filed application S.N. 306,683, filed Sept. 5, 1963, now abandoned.

This invention relates to organic sulfide-chloramine adducts. In one specific aspect it relates to methods of preparation of diimines of organic sulfides.

It is an object of this invention to provide a general method for preparing organic sulfide-chloramine adducts. It is another object to provide sulfide-chloramine adducts as new compositions.

We have discovered a new and useful series of sulfur and nitrogen containing compounds, made by a novel reaction. We have found that organic sulfides react with chloramine in accordance with the following reaction:

$$H_2S + 2NH_2Cl \rightarrow R_2SN_2H_2 + 2HCl$$

wherein R can be the same or different alkyl groups containing from 1 to 36 carbon atoms, aryl groups, and substituted alkyl and aryl groups. These materials are useful as rubber vulcanizing agents, pharmaceuticals, insecticides, intermediates in organic synthesis, bacteriocides, fungicides, and anti-oxidants such as polymer stabilizers.

In the preferred embodiment of our invention an organic sulfide such as diethyl sulfide in 2-propanol is chloraminated with a gaseous stream of chloramine and ammonia. An alternate method consists in the use of a concentric stream of chlorine surrounded by ammonia, introduced directly into a 2-propanol solution of the sulfide. The chloramine is conveniently synthesized by the ammonia-chlorine reaction in the gas phase. This reaction is described by Sisler et al. in JACS 76, 3906 (1954).

Another alternate method for preparing this family of compounds involves the reaction of a dialkyl sulfilimine with chloramine:

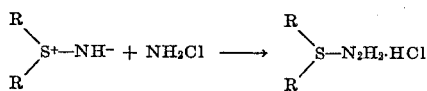

The reaction product is recovered by removing the excess ammonium chloride formed in the reaction by filtration and crystallizing the partly concentrated 2-propanol solution. The addition of acetone to the 2-propanol solution insures a more complete precipitation of the product.

In the reaction diethyl sulfide combines with chloramine to form a product having the general formula:

$$[(C_2H_5)_2SN_2H_2]_2 \cdot HCl$$

which can be visualized as having one of the following isomeric structures:

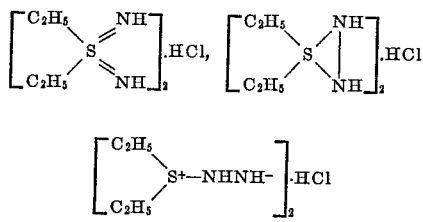

or

The free base $(C_2H_5)_2SN_2H_2$ or its dimer can be prepared from the hydrochloride by treatment with bases such as sodium methoxide or by sublimation. It is then possible to add one or two moles of hydrochloric acid or other acids to form two series of salts:

$$[(C_2H_5)_2SN_2H_2]_2 \cdot HCl$$

and $$(C_2H_5)_2SN_2H_2 \cdot HCl$$

The exact ratio of chloramine to sulfide in the liquid reaction mixture will vary with the different organic sulfur compounds used and will be dependent upon the rate of reaction for the particular compound and the conditions of temperatures and pressure under which the reaction is conducted.

The final reaction mixture may contain unreacted sulfur containing compounds, ammonium chloride, ammonia, and possibly small amounts of decomposition products of the various reactants.

The reaction between the organic sulfide and chloramine is carried out in the presence of a solvent which is non-reactive with respect to both reactants and product and is preferably a solvent for the product. Solvents which may be used in the practice of this invention include the lower alcohols, chlorinated aliphatic hydrocarbons, and the like.

The temperature of the reaction may range from −40° C. to the boiling point of the solvent used (i.e. 100° C.). The temperature can be varied in accordance with such factors as the solubility, volatility and reactivity of the sulfide used and the boiling and freezing points of the solvent.

The acid addition salts of the sulfide-chloramine reaction product can be prepared from the free base or the hydrochloride. Among the acids that can be used are hydrobromic, sulfuric, picric, oxalic, citric, benzoic and the like. In preparing the acid salt from the hydrochloride two methods can be used. The first is to react a base such as sodium methoxide (in alcohol) with the hydrochloride, filter off the resulting sodium chloride and add the desired acid to form the salt. The second is to pass the hydrochloride over an anion ion-exchange resin bed which has been previously treated with the appropriate acid salt.

The present invention will be further illustrated, but not limited by, the following examples:

Example I.—Preparation of $[(C_2H_5)_2SN_2H_2]_2 \cdot HCl$ (A) One liter of a 2-propanol solution containing 90 grams (1.0 mole) of diethyl sulfide was placed in a 3 liter resin kettle equipped with a gas inlet tube, thermometer, stirrer, and reflux condenser. An external water bath was used to maintain the solution near room temperature. A stream of chloramine in excess ammonia, prepared by the method of Sisler et al. (JACS 76, 3096, 1954), and filtered free of ammonium chloride, was then introduced into the sulfide solution at the rate of 0.01 mole/min. The chloramination was continued for 3 hrs. at which time a total of 1.8 moles of chloramine had been introduced into the solution.

Absorption was quantitative as evidenced by the absence of chloramine in the vented gas from the reaction vessel, which contained only ammonia and traces of sulfide. The reaction mixture was filtered and the filtrate evaporated under vacuum to give 94 gms. of a brownish oil. The oil was diluted with an equal weight of acetone and allowed to crystallize by cooling to 8–10° C. for one week. The crystalline precipitate obtained was filtered by suction, washed with 2-propanol and dried, yielding 27.6 gms. of crystals melting at 91–93° C., with decomposition at 186° C.

(B) 90 gms. (1.0 mole) of diethyl sulfide was reacted in 2 liters of 2-propanol with 3 moles of filtered chloramine as described under A. After filtering off the ammonium chloride and evaporating the filtrate, 147 grams of an oil were recovered. 75 gms. of acetone were added to the oil and the mixture cooled. 32 gms. of product were then recovered by filtration having a melting point of 94.2–95.1° C. and decomposing at 186° C.

Elemental analysis of the compound $C_8H_{25}N_4S_2Cl$ from A and B above is shown as follows:

Analysis.—Calc.: C, 34.70; H, 9.10; N, 20.23; S, 23.16; Cl, 12.81. Found: C, 34.73; H, 9.57; N, 20.19; S, 23.55; Cl, 12.97.

(C) 90 gms. (1.0 mole) of diethyl sulfide was dissolved in 2 liters of 2-propanol, and the solution transferred to a 4 liter resin kettle equipped with a condenser and concentric spray nozzle system. Through the central nozzle, a stream of chlorine gas was introduced into the solution at the rate of 3 gms. of $Cl_2$ per min., while gaseous anhydrous ammonia was simultaneously added through the outer nozzle at the rate 7 gms. per min. The gas introduction was continued until a total of 385 gms. (5.4 moles) of chlorine had been added. The reaction mixture was filtered by suction to remove the ammonium chloride, which was washed with 2-propanol. The combined filtrates were concentrated under a vacuum to a syrupy slurry weighing 154 gms. When allowed to crystallize in a refrigerator, crystals deposited. These were separated by filtration, yielding 38.8 g. of

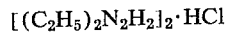
$[(C_2H_5)_2N_2H_2]_2 \cdot HCl$

M.P. 91.5–96° C. A second crop of 5.5 gms. was obtained on further evaporation of the filtrate and additions of acetone. The overall yield was 44.3 gms.=32%.

(D) 1. From diethylsulfilimine.

Solution containing 12.7 gms. (0.141 mole) of ethyl sulfide in 100 ml. methanol was added to 100 ml. methanol containing 3.3 gms. (0.143 mole) of sodium. Fifty mls. of methanol containing 9.1 gms. (0.08 mole) of O-aminosulfonic acid was slowly added over a 15 min. period. Slight heating was noticed during the addition. The mixture was heated to reflux, cooled and filtered. The filtrate was evaporated under vacuum to give 7.3 gms. of a brownish oil.

To check the composition of this material a portion of this oil (2.0 gms.) was reacted in 10 ml. of water with 10 ml. of a picric acid solution saturated at 50° C. Orange-yellow needles were precipitated, M.P. 113.5–114.5° C. The reported melting point for the picric acid salt of diethylsulfilimine is 111° C.

5.3 gms. of the crude diethylsulfilimine as prepared above were dissolved in 2-propanol and treated with 0.3 mole of gaseous chloramine in excess ammonia. The resulting slurry was filtered to remove the ammonium chloride, and the filtrate evaporated under vacuum. Excess acetone was added, precipitating 2 gms. of white crystals, M.P. 89–93° C. Recrystallization from 2-propanol-acetone raised the melting point to 92.5–95° C. The ionic chloride content of this sample was 12.5% (calculated for $C_8H_{25}N_4S_2Cl$, 12.8%).

(E) One liter of a 2-propanol solution containing 18 gms. (0.2 mole) of diethyl sulfide was placed in a 3 liter resin kettle equipped with a gas inlet tube, thermometer, stirrer and efficient reflux condenser. The solution was heated to reflux temperature and a stream of chloramine added at a rate of 0.01 mole per min, as in Example IA. Additional sulfide was added in 18 gm. portions every half hour for a total of 90 gms. (1.0 mole). After cooling, the mixture was filtered and the filtrate concentrated and cooled to give the product.

Example II.—Preparation of $(CH_3)_2SN_2H_2 \cdot HCl$ 31 gms. (0.5 mole) of dimethyl sulfide was dissolved in 2 liters of 2-propanol. 1.65 moles of chloramine in excess ammonia were reacted with the sulfide, as described in A above. The reaction was maintained at room temperature for 45 min., and then filtered to remove ammonium chloride. The filtrate was then evaporated to dryness, yielding a viscous residue. On standing, a solid deposited, which was filtered off. The melting point of this product was 111–113° C., decomposition at 172° C.

Elemental analysis for $C_2H_9N_2SCl$ was as follows—
Analysis.—Calc.: C, 18.67; H, 7.05; N, 21.78; S, 24.93. Found: C, 18.39; H, 6.53; N, 21.71; S, 25.20.

Example III.—Preparation of $(C_4H_9)_2SN_2H_2 \cdot HCl$ 146 gms. (1 mole) of n-butyl sulfide were dissolved in 1 liter of 2-propanol. Filtered chloramine (2.9 moles) was bubbled through as described in Example IA. At the completion of the gas introduction, the reaction mix was allowed to stand to allow for complete decomposition of the excess chloramine. The reaction mix was filtered and the filtrate evaporated under vacuum at room temperature to give a semi-solid material. 20 gms. of this material were dissolved in 100 mls. of cold 2-propanol, heated to 45° C. and then filtered. The clear filtrate was combined with 40 mls. (0.04 mole) of a 2-propanol alcohol solution of HCl. Upon cooling, 4.5 gms. of flat white plates were obtained. These plates were recrystallized from warm 2-propanol and the melting point of the resulting crystals was 131–132° C.

Elemental analysis for $C_8H_{21}N_2SCl$ was as follows—
Analysis.—Calc.: C, 45.15; H, 9.95; N, 13.17; S, 15.07; Cl, 16.66. Found: C, 44.49; H, 9.98; N, 12.71; S, 15.20; Cl, 16.59.

Example IV.—Preparation of $(C_8H_{17})_2SN_2H_2 \cdot HCl$ 81 gms. (0.32 mole) of di-n-octyl sulfide were dissolved in 244 gms. of 2-propanol and treated with 2.25 moles of filtered chloramine at room temperature by the method described above in Example IA. The ammonium chloride was removed from the reaction mix by filtration and the filtrate evaporated under vacuum. A crude product of $(C_8H_{17})_2SN_2H_2 \cdot HCl$ was obtained as a waxy solid.

Example V.—Preparation of free base $(C_2H_5)_2SN_2H_2$ (A) By reaction of $[(C_2H_5)_2SN_2H_4]_2 \cdot HCl$ with sodium methoxide.

A 73 ml. portion (0.05 mole) of a 0.68 N solution of sodium methoxide in 2-propanol was treated with 13.7 g. (0.05) of $[(C_2H_5)_2SN_2H_4]_2 \cdot HCl$ dissolved in 2-propanol. The sodium chloride was filtered and the solvent was evaporated at room temperature under vacuum. The residue was recrystallized from acetone to give hygroscopic crystals melting at 43–49° which could easily be sublimed at 80° under vacuum.

(B) By sublimation of $[(C_2H_5)_2SN_2H_2]_2 \cdot HCl$

A 4 g. sample of $[(C_2H_5)_2SN_2H_2]_2 \cdot HCl$ was placed in a sublimation apparatus and heated to 80° at 0.1 mm. A low melting (47.5–49°) solid slowly sublimed (ca. 1.5 g.).

Elemental anaylsis for $C_4H_{12}N_2S$ was as follows—
Analysis.—Calc.: C, 39.96; H, 10.06; N, 23.30; S, 26.67. Found: C, 39.76; H, 9.68; N, 23.13; S, 26.87.

Example VI 1 gram of $(C_2H_5)_2SN_2H_2$ was dissolved in 5 ml. of 2-propanol. An 0.1 N HBr solution in alcohol was added to neutralize the free base. After stripping the solvent, white glistening crystals of the hydrobromide $(C_2H_5)_2 \cdot HBr$ were isolated.

Example VII.—Preparation of $(C_6H_5CH_2)_2SN_2H_2 \cdot HCl$ 214 grams (1 mole) of dibenzyl sulfide were dissolved in 1 liter of 2-propanol. Filtered chloramine (2.9 moles) was introduced into the solution as described in Example IA. At the completion of the gas introduction, the reaction mix was allowed to stand to assure complete decomposition of excess chloramine. The reaction mix was then filtered and the filtrate evaporated under vacuum at room temperature to give an oil.

Example VIII.—Preparation of $(C_2H_4OH)_2SN_2H_2 \cdot HCl$ 124 grams (1 mole) of bis-hydroxyethyl sulfide were dissolved in 1 liter of 2-propanol. Filtered chloramine (2.9 moles) was introduced into the solution as described in Example IA. At the completion of the gas introduction, the reaction mix was allowed to stand to assure complete decomposition of excess chloramine. The reaction mix was then filtered and the filtrate evaporated under vacuum at room temperature to give an oil.

Example IX.—Activity of $[(C_2H_5)_2SN_2H_2]_2 \cdot HCl$ as foliar fungicide

A 25% aqueous solution of $[(C_2H_5)_2SN_2H_2]_2 \cdot HCl$ was applied to tomato foliage (variety Bonnie Best) at a dosage of 500 p.p.m. while the plants were being rotated on a turn-table. The spray deposit was allowed to thoroughly dry on the foliage and then sprayed with a spore suspension of *Alternaria solani* again while they were being rotated on a turn-table. Immediately after inoculation the plants were transferred to a constant temperature humidity cabinet for a 24 hr. period. At the end of this time the plants were moved to the greenhouse bench.

Five to six days after incubation the untreated check controls showed some 150 to 250 early blight lesions per three sets of three terminal leaflets per plant. Percent control was recorded as the percentage of lesions occurring on the treated plants over the number of lesions occuring on the untreated control.

$[(C_2H_5)_2SN_2H_2]_2 \cdot HCl$ showed a 25% blight control at 500 p.p.m.

Example X.—Soil fungicide activity of $[(C_2H_5)_2SN_2H_2]_2 \cdot HCl$

Four soil organisms (Pythium Rhizoctonia, Sclerotium and Fusarium) were prepared separately from pure culture stock as follows:

The respective organisms were raised in a pure culture of sterile soil plus 20% of cornmeal and the final infested soil prepared by using 10% by weight of this pure culture plus 90% by weight of methyl bromide sterilized soil. The respective infested soils were placed in triplicate souffle cups containing 50 grams each of soil and planted with appropriate crop. Treatment consisted of adding a solution of $[(C_2H_5)_2SN_2H_2]_2 \cdot HCl$ to obtain a final chemical concentration of 100 p.p.m. of chemical by weight of soil. This dosage in turn would be the equivalent of a 4 pound per acre in furrow treatment. The rate of mycelial growth varies by organism and at such appropriate time masses of white mycelial growth occur superficially on the surface of the soil providing a readily recognizable indication of mycelial growth inhibition merely by the appearance of the soil surface. The extent of mycelial growth was recorded on a basis of 0 to 5 in which 0 indicated no mycelial growth to the other extreme wherein 5 indicated that the mycelial growth was extensive and comparable to that occurring in the check.

In the Pythium infested soil, pea seeds were planted, in the case of Rhizoctonia infested soil beet seeds were planted and in Fusarium infested soil tomato seeds were planted. At the appropriate time depending upon disease incidence, rapidity of growth and other factors, stand counts expressed in percentage was obtained.

The results are as follows:

|  | Pythium (Peas) | | Rhizoctonia (Beets) | | Sclerotium, MYC Growth | Fusarium (Tomato) | |
| --- | --- | --- | --- | --- | --- | --- | --- |
|  | MYC Growth | Percent Stand | MYC Growth | Percent Stand |  | MYC Growth | Percent Stand |
| Dose, p.p.m.: |  |  |  |  |  |  |  |
| 100 | 4 | 0 | 4 | 30 | 5 | 5 | 70 |
| Control | 5 | 0 | 5 | 0 | 5 | 5 | 60 |

Example XI.—Aphicidial activity of $[(C_2H_5)_2SN_2H_2]_2 \cdot HCl$

Portions of broad beans heavily infested with bean aphid (*Aphis rumus*) were excised and momentarily immersed in the 100 p.p.m. of the compound. The excised and treated portions were then transferred to sterile plastic petri plates and percent mortality recorded.

$[(C_2H_5)_2SN_2H_2]_2 \cdot HCl$ gave a 25% aphid hill in 24 hrs.

Example XII.—$[(C_2H_5)_2SN_2H_2]_2 \cdot HCl$ as a blowing agent.

A homopolymer of ethylene, density 0.92, and melt index 2.0, was mixed with 3 percent weight of finely pulverized $[(C_2H_5)_2SN_2H_2]_2 \cdot HCl$ in a Banbury mixer. The mix temperature was maintained below 100–110° C. After mixing, a portion of the mass was transferred to a heated press maintained at 100° C. The press was then rapidly heated to 200° C. After approximately 6 min. the press was opened and the foamed mass removed.

The orther portion of the mass from the Banbury mixer was placed in a preheated (200° C.) mold. The mold was closed at a ram pressure of 200–2000 p.s.i. After 2 to 6 minutes the mold was cooled, then opened to remove the foamed polymeric mass.

What is claimed is:

1. A method of forming a chloramine-sulfide reaction product having the structure $(R_2SN_2H_2)_x \cdot HCl$ where $x$ is 1 or 2, wherein R is a member of the group consisting of alkyl having 1 to 36 carbon atoms and substituted alkyl having 1 to 36 carbon atoms wherein the substituent is chosen from the group consisting of hydroxyl and phenyl, which comprises reacting $R_2S$ where R has the meaning given above, with chloramine at a temperature from about −40 to 100° C. in the presence of an inert solvent.

2. The method of claim 1 wherein $R_2S$ is methyl sulfide.
3. The method of claim 1 wherein $R_2S$ is ethyl sulfide.
4. The method of claim 1 wherein $R_2S$ is n-butyl sulfide.
5. The method of claim 1 wherein $R_2S$ is n-octyl sulfide.
6. A compound selected from the group $R_2SN_2H_2$ and the dimer $[R_2SN_2H_2]_2$, wherein R is a member of the group consisting of alkyl having 1 to 36 carton atoms and substituted alkyl having 1 to 36 carbon atoms wherein the substituent is chosen from the group consisting of hydroxyl and phenyl.
7. The acid addition salt of the compound of claim 6.

8. The compound having the structural formula $(CH_3)_2SN_2H_2$.

9. The compound having the structural formula $(C_2H_5)_2SN_2H_2$.

10. The compound having the structural formula $(C_4H_9)_2SN_2H_2$.

11. The compound having the structural formula $(C_8H_{17})_2SN_2H_2$.

References Cited

Cogliano et al.: J. Org. Chem., vol. 29, p. 1397 (1964).

JOHN D. RANDOLPH, *Primary Examiner.*

WALTER A. MODANCE, *Examiner.*

H. I. MOATZ, *Assistant Examiner.*